United States Patent
Fisanich

[19]

[11] Patent Number: 6,012,228
[45] Date of Patent: Jan. 11, 2000

[54] COLOR CODED FOOTBALL YARDAGE MEASURING SLEEVE

[76] Inventor: Gregory M. Fisanich, 6-E Plateau Pl., Greenbelt, Md. 20770

[21] Appl. No.: 08/985,411

[22] Filed: Dec. 4, 1997

[51] Int. Cl.⁷ ........................................................ G01B 3/11
[52] U.S. Cl. .................................. 33/289; 33/759; 33/771
[58] Field of Search ............................. 33/289, 493, 494, 33/700, 755, 756, 759, 760, 771, 679.1, 1 G; 59/78, 80, 93; 116/222; 473/438, 470, 490

[56] References Cited

U.S. PATENT DOCUMENTS

| | | | |
|---|---|---|---|
| 1,105,925 | 8/1914 | Reynolds | 59/78 |
| 1,645,707 | 10/1927 | Lipp | 33/759 |
| 1,684,566 | 9/1928 | Winkler | 33/759 |
| 1,982,304 | 11/1934 | Holden | 33/756 |
| 2,060,165 | 11/1936 | Borleske | 33/289 |
| 2,077,828 | 4/1937 | Dombrowski | 33/494 |
| 2,110,226 | 3/1938 | Hill | 59/78 |
| 2,602,233 | 7/1952 | Irving | 33/756 |
| 4,942,670 | 7/1990 | Brandt | 33/759 |
| 5,371,949 | 12/1994 | Delaurier | 33/1 G |
| 5,519,940 | 5/1996 | Brondfield | 33/1 G |

FOREIGN PATENT DOCUMENTS

| | | | |
|---|---|---|---|
| 67014 | 11/1957 | France | 33/494 |

*Primary Examiner*—G. Bradley Bennett

[57] ABSTRACT

A new color coded football yardage measuring sleeve for showing an exact distance a football team must move to achieve a first down when measuring chains are brought onto a football field. The inventive device includes a cylindrical sleeve portion having opposed open ends for receiving an existing yardage chain therein. The sleeve portion has a length of ten yards. The cylindrical sleeve portion is divided into one yard increments of alternating colors.

3 Claims, 2 Drawing Sheets

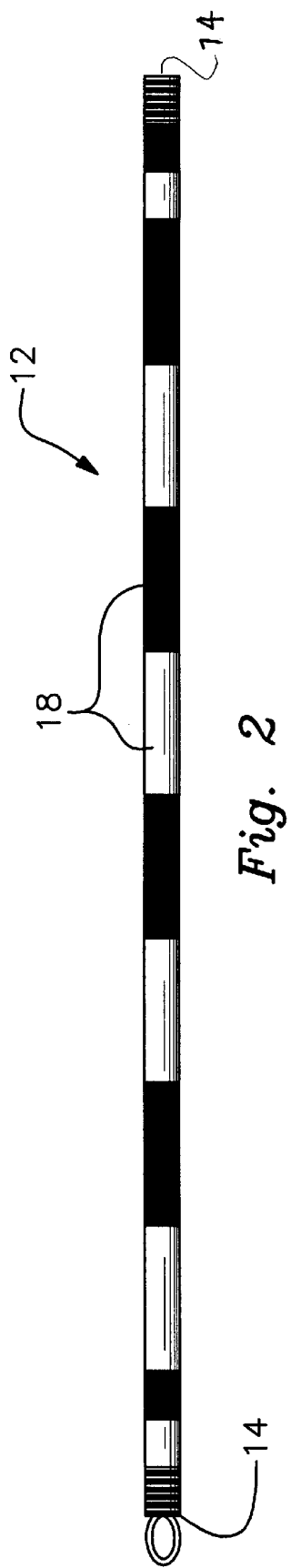
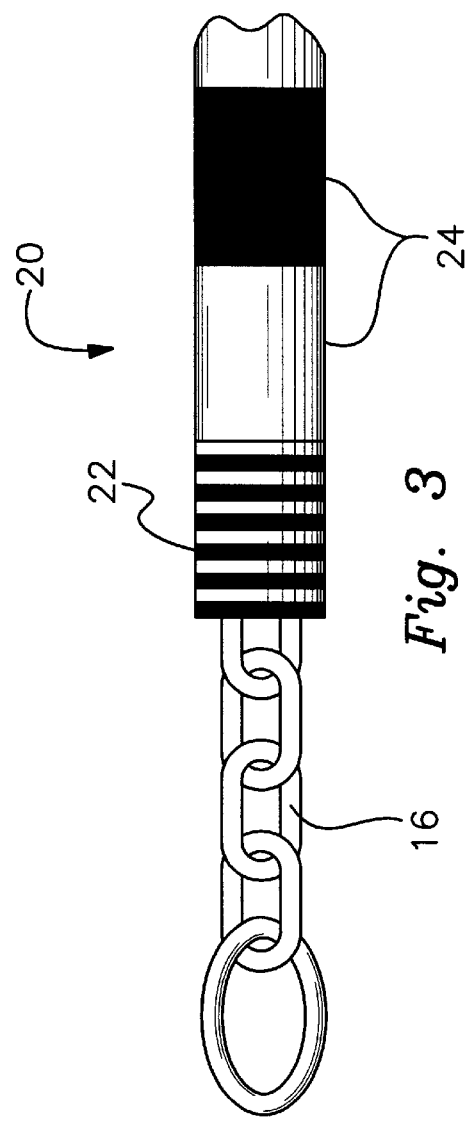

COLOR CODED FOOTBALL YARDAGE MEASURING SLEEVE

BACKGROUND OF THE INVENTION

1. Field of the Invention

The present invention relates to measuring devices and more particularly pertains to a new color coded football yardage measuring sleeve for showing an exact distance a football team must move to achieve a first down when measuring chains are brought onto a football field.

2. Description of the Prior Art

The use of measuring devices is known in the prior art. More specifically, measuring devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art measuring devices include U.S. Pat. No. 5,189,803 to Caywood; U.S. Pat. No. 4,858,328 to Heinen; U.S. Pat. No. 5,181,750 to Reum; U.S. Pat. No. 4,634,804 to Spalding; U.S. Pat. No. 4,838,794 to Coddington; and U.S. Pat. No. Des. 344,040 to Rozenwasser.

While these devices fulfill their respective, particular objectives and requirements, the aforementioned patents do not disclose a new color coded football yardage measuring sleeve. The inventive device includes a cylindrical sleeve portion having opposed open ends for receiving an existing yardage chain therein. The sleeve portion has a length of ten yards. The cylindrical sleeve portion is divided into one yard increments of alternating colors.

In these respects, the color coded football yardage measuring sleeve according to the present invention substantially departs from the conventional concepts and designs of the prior art, and in so doing provides an apparatus primarily developed for the purpose of showing an exact distance a football team must move to achieve a first down when measuring chains are brought onto a football field.

SUMMARY OF THE INVENTION

In view of the foregoing disadvantages inherent in the known types of measuring devices now present in the prior art, the present invention provides a new color coded football yardage measuring sleeve construction wherein the same can be utilized for showing an exact distance a football team must move to achieve a first down when measuring chains are brought onto a football field.

The general purpose of the present invention, which will be described subsequently in greater detail, is to provide a new color coded football yardage measuring sleeve apparatus and method which has many of the advantages of the measuring devices mentioned heretofore and many novel features that result in a new color coded football yardage measuring sleeve which is not anticipated, rendered obvious, suggested, or even implied by any of the prior art measuring devices, either alone or in any combination thereof.

To attain this, the present invention generally comprises a cylindrical sleeve portion having opposed open ends for receiving an existing yardage chain therein. The sleeve portion has a length of ten yards. The cylindrical sleeve portion is divided into one yard increments of alternating colors. Outer end increments of the cylindrical sleeve portion have an outer twelve inch segment divided into one inch increments of alternating colors and alternating twelve inch increments of alternating colors inwardly thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new color coded football yardage measuring sleeve apparatus and method which has many of the advantages of the measuring devices mentioned heretofore and many novel features that result in a new color coded football yardage measuring sleeve which is not anticipated, rendered obvious, suggested, or even implied by any of the prior art measuring devices, either alone or in any combination thereof.

It is another object of the present invention to provide a new color coded football yardage measuring sleeve which may be easily and efficiently manufactured and marketed.

It is a further object of the present invention to provide a new color coded football yardage measuring sleeve which is of a durable and reliable construction.

An even further object of the present invention is to provide a new color coded football yardage measuring sleeve which is susceptible of a low cost of manufacture with regard to both materials and labor, and which accordingly is then susceptible of low prices of sale to the consuming public, thereby making such color coded football yardage measuring sleeve economically available to the buying public.

Still yet another object of the present invention is to provide a new color coded football yardage measuring sleeve which provides in the apparatuses and methods of the prior art some of the advantages thereof, while simultaneously overcoming some of the disadvantages normally associated therewith.

Still another object of the present invention is to provide a new color coded football yardage measuring sleeve for showing an exact distance a football team must move to achieve a first down when measuring chains are brought onto a football field.

Yet another object of the present invention is to provide a new color coded football yardage measuring sleeve which includes a cylindrical sleeve portion having opposed open ends for receiving an existing yardage chain therein. The sleeve portion has a length of ten yards. The cylindrical sleeve portion is divided into one yard increments of alternating colors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevation view of the present invention.

FIG. 3 is a partial side elevation view of the present invention.

DESCRIPTION OF THE PREFERRED EMBODIMENT

Figure 1:
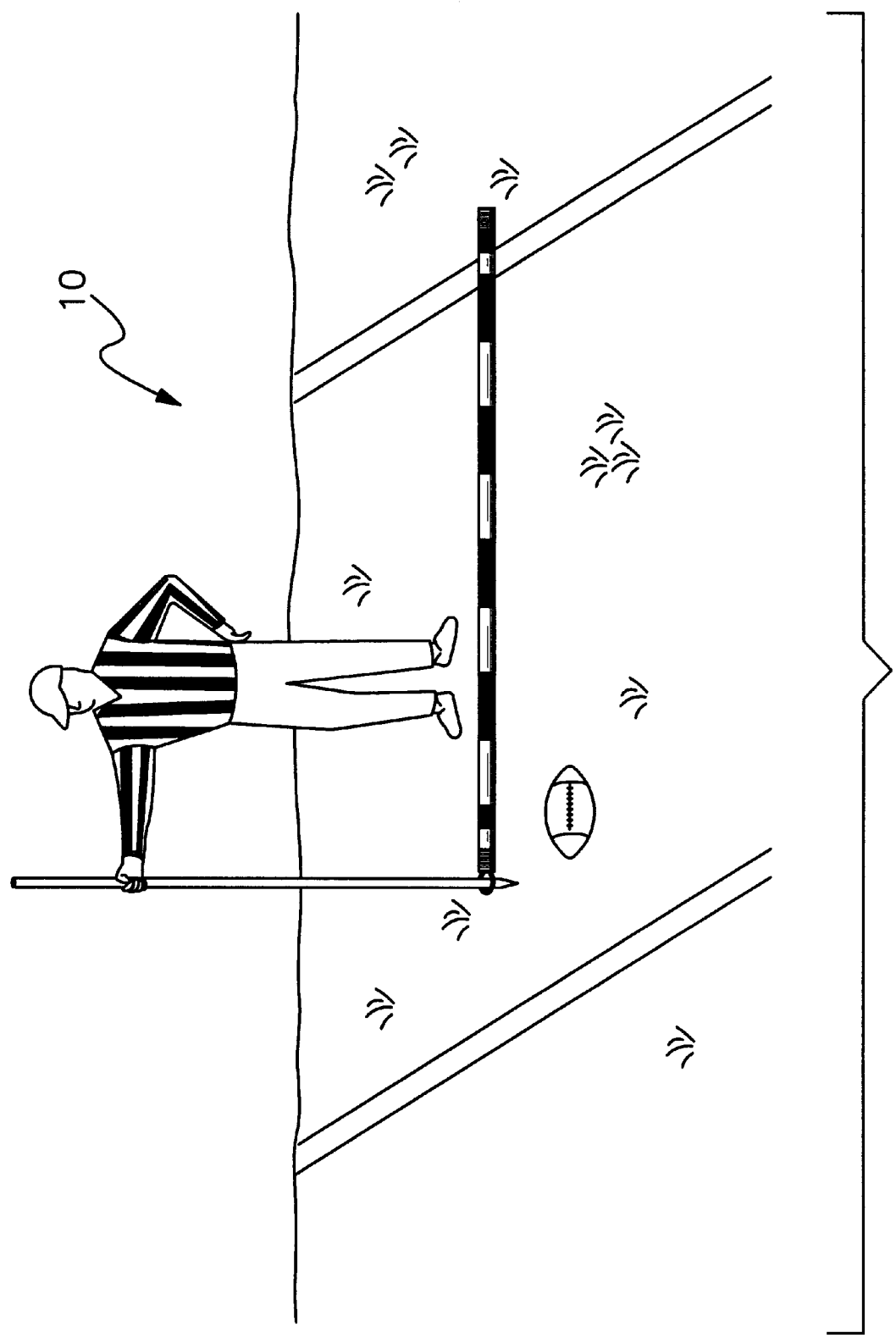
FIG. 1 is a perspective view of a new color coded football yardage measuring sleeve according to the present invention.

With reference now to the drawings, and in particular to FIGS. 1 through 3 thereof, a new color coded football yardage measuring sleeve embodying the principles and concepts of the present invention and generally designated by the reference numeral 10 will be described.

As best illustrated in FIGS. 1 through 3, the color coded football yardage measuring sleeve 10 comprises a cylindrical sleeve portion 12 having opposed open ends 14 for receiving an existing yardage chain 16 therein. The cylindrical sleeve 12 is preferably constructed of a rubber material, natural or synthetic, in order to hold up the rigors of the game of football. The sleeve portion 12 has a length of ten yards. This length will accommodate the length of the yardage chain 16. The cylindrical sleeve portion 12 is divided into one yard increments of alternating colors 18. These colors would be black and white or colors that match the home team in the football game. Outer end increments 20 of the cylindrical sleeve portion 12 have an outer twelve inch segment 22 divided into one inch increments of alternating colors and alternating twelve inch increments of alternating colors 24 inwardly thereof.

In use, the present invention would show exactly how far a football team must move the ball to get a first down. Normally, an official will hold his hands up to show the distance required for a first down. This typically is not exact. The present invention will show the exact distance in terms of feet and inches that first down is away. The alternating colors 18 of the sleeve 12 allow for those people not on the field of play to visualize the exact distance the ball is from the first down.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A color coded football yardage measuring sleeve for showing an exact distance a football team must move to achieve a first down when measuring chains are brought onto a football field, the measuring sleeve comprising:

a cylindrical sleeve portion having opposed open ends such that the sleeve is adapted for covering a football yardage chain, the sleeve portion having a full length of ten yards, the cylindrical sleeve portion having an interior portion having a length of 8 yards having yard indicia being divided into one yard increments of alternating first and second colors, said sleeve portion having two opposite outer portions each having a length of one yard, each outer portion having a distal twelve inch segment divided into one inch increments having alternating inch indicia of said first and second colors, each outer portion further having an inner portion having a length of two feet divided into one foot increments having alternating foot indicia of said first and second colors, the inner portion being disposed inwardly of the outer twelve inch segment.

2. A color coded football yardage measuring sleeve for showing an exact distance a football team must move to achieve a first down when measuring chains are brought onto a football field, the measuring sleeve comprising:

a cylindrical sleeve having opposed open ends such that said sleeve is adapted for covering an existing yardage chain, the sleeve having a full length of ten yards, the sleeve being divided into an interior portion and two opposite outer portions, the interior portion having a length of 8 yards divided into one yard increments of alternating first and second colors, the outer portions each having a length of one yard divided into one foot increments, an innermost pair of said one foot increments being indicated by alternating of said first and second colors along each said innermost pair of said one foot increments.

3. The color coded football yardage measuring sleeve as set forth in claim 2 wherein each outer portion includes a distal twelve inch segment divided into one inch increments, said one inch increments being indicated bv alternating of said first and second colors along each said distal twelve inch segment.

* * * * *